(12) United States Patent
Lee et al.

(10) Patent No.: US 8,416,840 B2
(45) Date of Patent: Apr. 9, 2013

(54) DUOBINARY TRANSCEIVER

(75) Inventors: Jri Lee, Taipei (TW); Ming-Shuan Chen, Taipei (TW); Huai-De Wang, Bade (TW)

(73) Assignee: National Taiwan University, Taipei (TW)

( * ) Notice: Subject to any disclaimer, the term of this patent is extended or adjusted under 35 U.S.C. 154(b) by 1253 days.

(21) Appl. No.: 12/203,492

(22) Filed: Sep. 3, 2008

(65) Prior Publication Data

US 2009/0296793 A1    Dec. 3, 2009

(30) Foreign Application Priority Data

Jun. 2, 2008   (TW) ................................. 97120522 A

(51) Int. Cl.
  *H04B 1/38*    (2006.01)
(52) U.S. Cl. .................... 375/222; 375/295; 375/316
(58) Field of Classification Search .................. 375/222, 375/295, 316
  See application file for complete search history.

(56) References Cited

U.S. PATENT DOCUMENTS

| | | | | |
|---|---|---|---|---|
| 4,115,786 A * | 9/1978 | Frey et al. ...................... 346/74.4 |
| 4,206,423 A * | 6/1980 | Nossen ........................... 332/104 |
| 4,206,424 A * | 6/1980 | Nossen ........................... 332/104 |
| 4,517,679 A * | 5/1985 | Clark et al. ..................... 375/259 |
| 4,808,884 A * | 2/1989 | Hull et al. ....................... 375/376 |
| 5,227,779 A * | 7/1993 | Falck ........................... 340/10.51 |
| 2003/0002121 A1* | 1/2003 | Miyamoto et al. ............ 359/183 |
| 2005/0122954 A1* | 6/2005 | Adamiecki et al. ........... 370/351 |

FOREIGN PATENT DOCUMENTS

| | | |
|---|---|---|
| TW | 359932 A4 | 6/1999 |
| TW | 94131656 | 8/2006 |

* cited by examiner

*Primary Examiner* — Shuwang Liu
*Assistant Examiner* — Michael Neff
(74) *Attorney, Agent, or Firm* — Volpe and Koenig, P.C.

(57) ABSTRACT

The present invention relates to a duobinary transceiver. Specifically, the duobinary transceiver circuit proposed by the invention provides a new circuit configure of a precoder in a typical transceiver and a decoder in a typical receiver, based on a conventional transceiver including a transmitter, a transmission medium, and a receiver.

19 Claims, 10 Drawing Sheets

DUOBINARY TRANSCEIVER

FIELD OF THE INVENTION

The present invention relates to communication apparatus with a high data transmission rate. More particularly, the present invention relates to a duobinary transceiver with a high data transmission rate.

BACKGROUND OF THE INVENTION

A conventional data communication system comprises a transmitter, a transmission media, and a receiver, wherein the transmission media may be named a channel in the communication field. Data are modulated to be modulated data by the transmitter. The modulated data are transmitted over the transmission media to the receiver, and then demodulated by the receiver. Non-return-to-zero (NRZ) signal is a signal as an example of modulation scheme used in a digital data communication system. In FIG. 1, a schematic waveform of an NRZ modulated signal is shown with its corresponding binary data. In the NRZ signal, a logical value 1 represents that the signal has a high voltage with a pulse width of T, and a logical value 0 represents that the signal has a low voltage also with a pulse width of T. The pulse width T is the reciprocal of the data rate. The NRZ modulated signal has both clock and data information and is thus not transmitted with a separate clock signal.

However, in telecommunication, transmission with a band-limited channel and multipath propagation brings the phenomenon of intersymbol interference (ISI), which makes the received signal distorted in the digital transmission system, wherein the distortion is shown as a form that a single signal is temporarily scattered and then overlapped. In order to avoid the intersymbol interference, a duobinary coding having the effect of adaptive equalization and error correcting codes is used as an embodiment at the present time.

It is understood that the NRZ modulated signal with its corresponding two-level binary signal, which is converted to three-level binary signal, is considered as one of correlative-level coding schemes. Specifically, the required bandwidth can be reduced to one half of the bit rate by the duobinary coding scheme, which improves the channel transmission efficiency.

FIG. 2 illustrates a schematic diagram of the communication system with a duobinary coding scheme using the NRZ modulated signal. The communication system (such as a transceiver) 2 in FIG. 2 includes a transmitter 210, a transmission media 220, and a receiver 230. The transmitter 210 includes a precoder 212, such as an 8B10B encoder, and an equalizer, such as a feed-forward equalizer, wherein the precoder 212 is used for encoding to input the binary data to another binary data sequence.

In general, as shown in FIG. 3, the precoder 212 includes a D flip-flop 2121 functioning as a delay line and a XOR gate 2122 used for encoding. The XOR gate 2122 in the precoder 212 receives a non-return-to-zero signal $D_{in}$ in a form of binary digital signal and a previous digital signal W[n-1] from the D-type flip-flop 2121 to implement an exclusive-OR operation to output a current digital signal W[n] wherein the previous digital signal W[n-1] is obtained via the D flip-flop 2121 for delaying the current digital signal W[n] by a duty cycle, that is, $W[n]=D_{in} \oplus W[n-1]$, and the current digital signal W[n], which is also called as a coded digital signal, is inputted into an input terminal D' of the D flip-flop 2121.

A clock signal $Ck_{in}$ is used as a trigger signal of the D flip-flop 2121. As known, any clock signal has two edges: a rising edge and a falling edge. In one embodiment, the rising edge is used and referred to as the leading edge, while the falling edge is used and referred to as the trailing edge. In other embodiments, the falling edge is used and referred to as the leading edge, while the rising edge is used and referred to as the trailing edge. Choosing which edge of the clock to use as the leading or trailing edge is a matter of design choice.

The previous digital signal W[n-1] from the D flip-flop 2121 and the NRZ modulated signal $D_{in}$ are respectively inputted to the XOR gate 2122 in the precoder 2122 that implements an exclusive-OR operation to generate the coded signal W[n] that is called as the Z-transform in the signal processing field. It is understood that the Z-transform converts a discrete time-domain signal, which is a sequence of real or complex numbers, into a complex frequency-domain representation.

It is still to be explained below. Mainly, the present communication system is a linear time-invariant system, and the transfer function is a mathematical representation, in terms of spatial or temporal frequency, of the relation between the input and output of a (linear time-invariant) system.

In its simplest form for the continuous-time input signal $D_{in}(t)$ and the output W[n](t), the transfer function H(x) is the linear mapping of the Laplace transform of the input, $D_{in}(s)$, to the output W[n](s). And then the transfer function H(x) is satisfied with a Equation (1), as will be described in detail below.

$$W[n](s)=H(s)D_{in}(s) \qquad \text{Equation}(1)$$

In the discrete-time system, the transfer function is similarly written as a Equation(2)

$W[n](Z)=H(Z)D_{in}(Z) \ldots$ Equation(2), it is well-known that the transfer function H(Z) is the inverse transfer function of the duobinary signal, i.e., $1/(1+Z^{-1})$.

Continually, the coded signal W[n] is equalized by the feed-forward equalizer 214 and then the feed-forward equalizer 214 is used to compensate for amplitude loss, which is caused by the channel 220. Known that the feed-forward equalizer 214 is a filter, preferably, the coefficients of the feed-forward equalizer 214 can be fitly updated, so that the feed-forward equalizer 214 can shape the NRZ modulated signal from a input terminal of the feed-forward equalizer 214 to the duobinary signal from a front input terminal of the receiver 230, wherein the transfer function H(Z) from the feed-forward equalizer 214 to the channel 220 is $1+Z^{-1}$.

The coded digital signal, which is received from the front input terminal of the receiver 230 through the channel 220, is called as a three-level duobinary signal y1 (regarded as a analog signal), wherein the three-level duobinary signal y1 from the channel 220 is obtained by an Equation (3), as will be described in detail below.

$$y1=W[n]+W[n-1] \qquad \text{Equation (3)}$$

As shown in FIG. 4, it is necessary to be explained that the NRZ modulated signal $D_{in}$ representing "1" and "0" digital data, where $T_b$ denotes the bit period of the signal. The NRZ modulated signal $D_{in}$ and the previous digital signal W[n-1] are processed through an XOR operation by the XOR gate 2122 to obtain the coded digital signal W[n], which are processed through the transfer function $H(Z)=1+Z^{-1}$ to obtain the three-level duobinary signal y1. The three-level duobinary signal y1 may include the values of 1, 0 or 2 as described below in Table 1.

TABLE 1

| Input | | Exclusive-OR operation | Transfer function | |
|---|---|---|---|---|
| $D_{in}$ | W[n − 1] | W[n] | H(z) | y1 |
| 0 | 0 | 0 | $1 + Z^{-1}$ | 0 |
| 0 | 1 | 1 | | 2 |
| 1 | 0 | 1 | | 1 |
| 1 | 1 | 0 | | 1 |

Moreover, as shown in FIG. 5, the three-level duobinary signal y1 is decoded by a decode circuit 231 in the receiver 230 and the three-level duobinary signal y1 is decoded into a series of digital numbers. The digital numbers may be binary, Gray code or two's complement binary.

It is seen by those ordinarily skilled in the art that the receiver 230 in the transceiver 2 can implement a conventional three-level Flash analog-to-digital converter (ADC) including a first and a second comparators 2311 and 2312, wherein the first and the second comparators 2311 and 2312 in the decoder circuit 231 both receive the three-level duobinary signal y1 from the channel 220, and the two comparators 2311 and 2312 have their respective reference voltages ref⁺ and ref⁻. The reference voltages ref⁺ and ref⁻ can be predetermined based on the voltage of the three-level duobinary signal y1 expected by the inside of the receiver 230 or set by an external circuit which is manually adjusted. The two comparators 2311 and 2312 output a two-bit comparison results (that is, each outputs a one-bit comparison result) based on their respective reference voltages, and the two-bit comparison results is decoded and recovered as one-bit digital data $D_{out}$ (with the value of 0 or 1) by using a logic circuit (for example, an XOR gate).

Note that the better operation for the precoder 210 is that the NRZ modulated signal $D_{in}$ is aligned with the transition edge of the previous digital signal W[n-1]. In order to meet this condition, the time sum of the gate delay $T_{XOR}$ of the XOR gate 2122 and the output delay $T_{D \to Q}$ for data of the D flip-flop 2121 to output therefrom is exactly equal to the bit period $T_b$ of the NRZ modulated signal $D_{in}$ as seen in FIG. 4.

As explained above, in order to generate the output delay $T_{D \to Q}$ for the data of the D flip-flop 2121, the phase difference the clock signal $CK_{in}$ is relative to the current digital signal W[n] needs to be maintained as a constant value. Unfortunately, when the transceiver 2 operates in a high speed, the phase difference of the clock signal $CK_{in}$ is relative to the current digital signal W[n] tends to drift to be difficultly controlled that makes the precoder 210 fail to operate in the high speed.

Therefore, the conventional receiver using two comparators with reference voltages, which are manually set or predetermined based on the voltage of the three-level binary signal. Under the PVT (Process, Voltage and Temperature) variation, the two comparators cannot dynamically vary the two different reference voltages, so that the three-level duobinary signal is made to occur many errors during the decoding period.

Thus, what is needed is a transceiver circuit to improve the defects from conventional transceiver in high operations or PVT variation.

SUMMARY OF THE INVENTION

In view of above, an embodiment of the present invention provides an duobinary transceiver with a high data transmission rate that is free from the drawbacks described above, and the another circuits proposed by the invention are implemented in a conventional precoder and in a conventional receiver respectively based on the conventional transceiver, which includes a transmitter, a transmission medium and a receiver.

According to an aspect of the present invention, there is provided a duobinary transceiver circuit, comprising:

a transmitter coding a first digital signal to generate a coded digital signal;

a transmission medium converting the coded digital signal to generate a duobinary digital signal; and a receiver receiving the duobinary digital signal through the transmission medium, and decoding and recovering the duobinary digital signal to generate a differential digital signal.

It is to be understood that both the foregoing general description and the following detailed description are by examples and are intended to provide further explanation of the invention as claimed.

DETAILED DESCRIPTION OF THE PREFERRED EMBODIMENT

The present invention will now be described more specifically with reference to the following embodiments. It is to be noted that the following descriptions of preferred embodiments of this invention are presented herein for the purposes of illustration and description only; it is not intended to be exhaustive or to be limited to the precise form disclosed.

Figure 1:
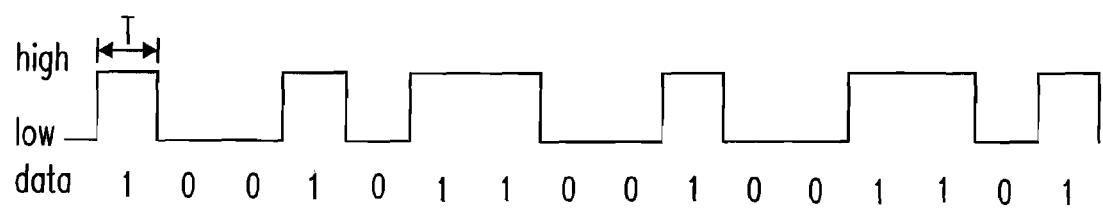
FIG. 1 schematically illustrates a waveform of an example NRZ data stream.
Figure 2:
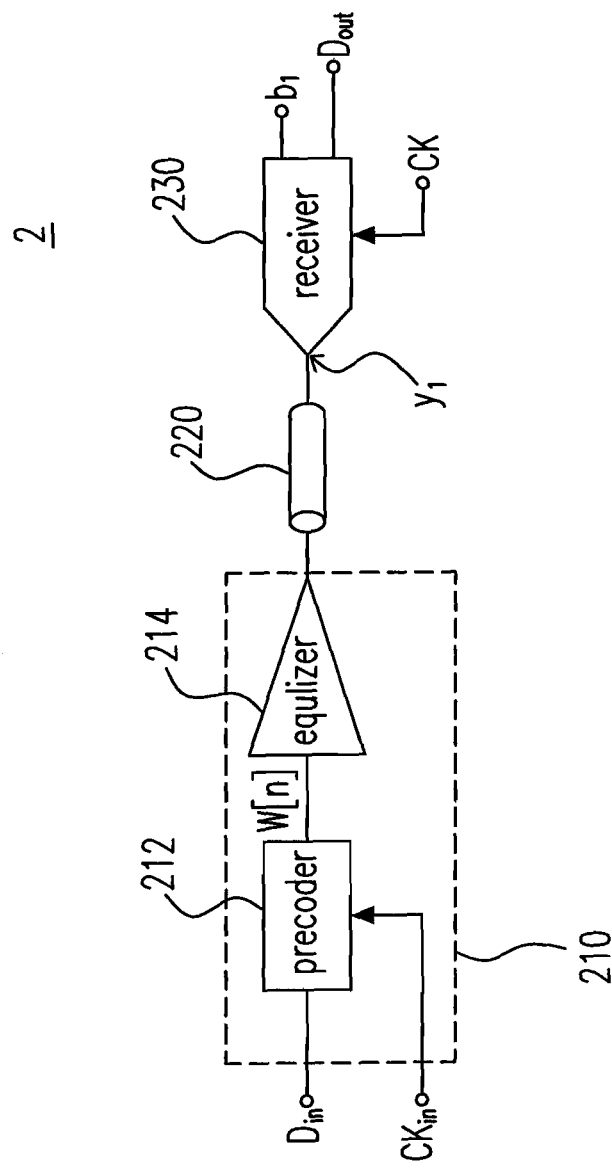
FIG. 2 schematically illustrates an example communications system employing NRZ modulation.
Figure 3:
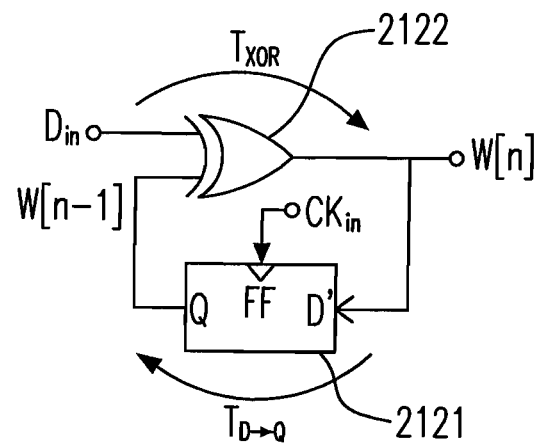
FIG. 3 shows a schematic diagram of a conventional precoder.
Figure 4:
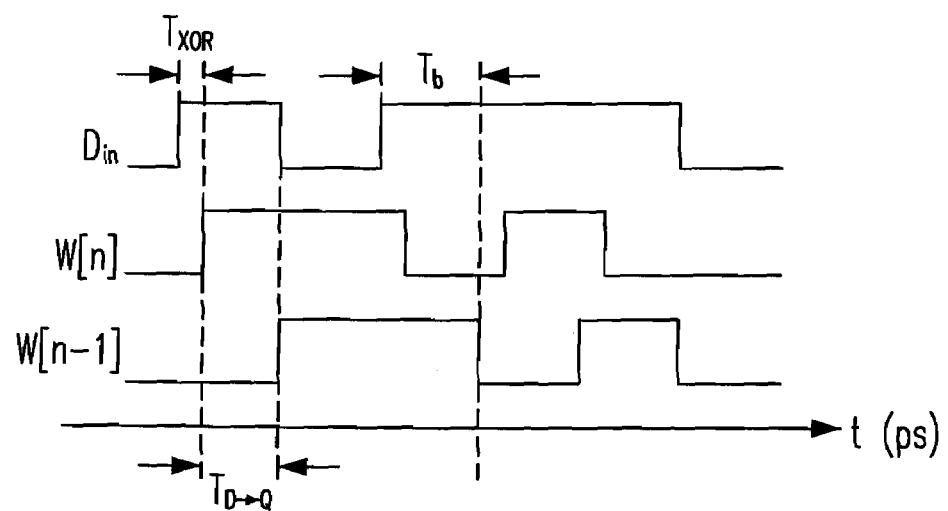
FIG. 4 shows waveforms of a NRZ, a current digital signal W[n] and a previous digital signal W[n]
Figure 5:
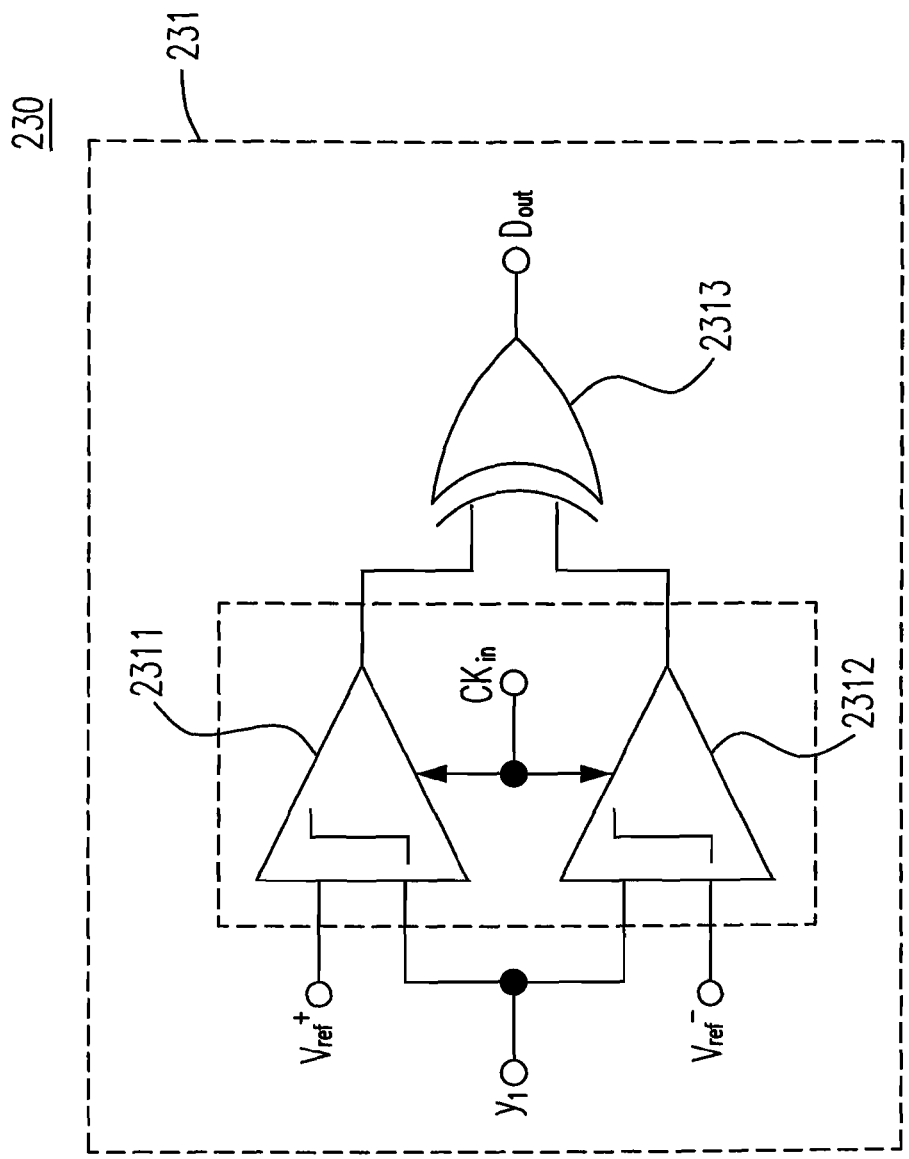
FIG. 5 shows a decoder circuit in a conventional receiver.
Figure 6:
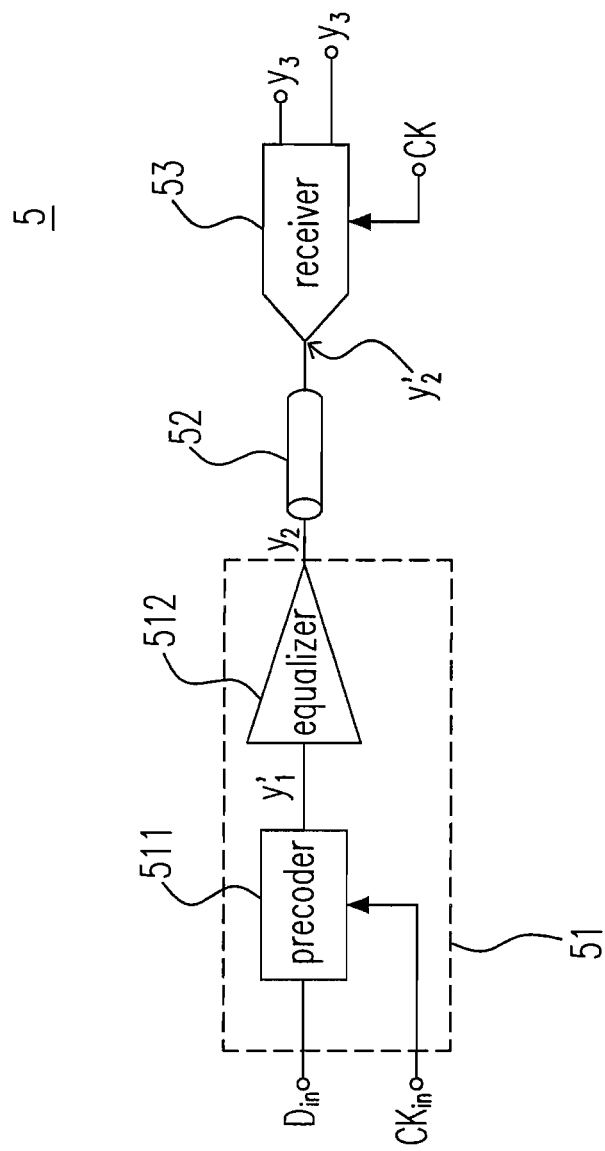
FIG. 6 shows a duobinary transceiver circuit in the embodiment.

FIG. 6 shows a circuit of a duobinary transceiver (abbreviated to transceiver below) including a transmitter 51, a transmission medium 52 (is also called as a channel in the communication field) and a receiver 53. The transmitter 51, which includes a precoder 511 and an equalizer 512, is used to convert the obtained data to a signal. The transmission medium 52 for carrying the signal can be regarded as material substance such as optical fiber, copper cable, or printed circuit board. The signal is transmitted through the transmission medium 52 and then the receiver 53 receives and converts the signal into useful information.

As described above, in order to solve the intersymbol interference in the telecommunication environment, the receiver 53 is configured to adopt the digital signals such as formed by the duobinary coding with the effect of the equalization and the error correcting code. The embodiment is described as follows.

A clock signal $CK_{in}$ generated from a clock generator (not shown) and a non-return-to-zero (NRZ) signal $D_{in}'$ being a digital signal generated from a PRBS generator (not shown) are respectively inputted into the transmitter 51, which includes the precoder 511 for coding the NRZ signal to output a coded digital signal y1'.

Figure 7:
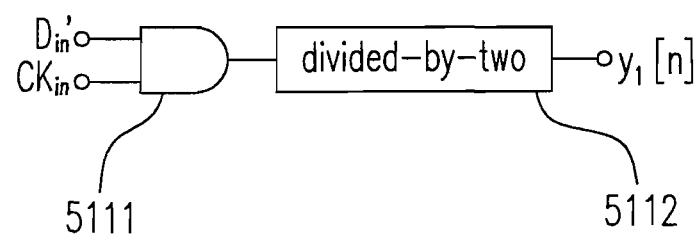
FIG. 7 shows a precoder circuit in the embodiment.

FIG. 7 shows the precoder circuit in the invention. The precoder 511 in the transmitter 51 includes an AND gate as a first logic circuit 5111 and a divided-by-two circuit 5112 and is obviously dissimilar to the conventional precoder. The AND gate 5111 modulates the digital signal $D_{in}'$ according to the clock signal $CK_{in}$ and then the modulated digital signal $D_{in}'$ is divided to output a coded digital signal y1' by the divided-by-two circuit 5112.

Based on the above-mentioned, as shown in FIG. 6, the coded digital signal y1' from the divided-by-two circuit 5112 is inputted into the equalizer 512 (for example, a forward compensating equalizer), which is a filter, in the transmitter 51. The forward compensating equalizer 512 performs an equalizing compensation for the coded digital signal y1' to output a compensated digital signal y2. It still requires to be explained that the compensated digital signal y2 has high frequency energy more than the coded digital signal y1' in order to counterbalance energy loss, which is caused by the coded digital signal y1' inputted in the channel 52. And then the transfer function from the feed-forward equalizer 512 to the channel 52 being $H(Z)=1+Z^{-1}$ makes the compensated digital signal y2, passing through the channel 52, be converted into a duobinary digital signal y2' (also called as a three-level duobinary signal), wherein the duobinary digital signal y2' from the channel 52 is obtained by Equation (4).

$$y2'=y1'[n]+y1'[n-1] \quad \text{Equation (4)}$$

wherein y1'[n] is a current coded digital signal and y1'[n-1] is a previous coded digital signal. The current coded digital signal y1'[n] leads/trails to the previous coded digital signal y1'[n-1] by a duty cycle. Noted that the three-level digital signal y2' from the channel 52 may include the value of 1, 0 or 2 as shown in Table 2.

TABLE 2

| Input | | Transfer function | |
|---|---|---|---|
| y1'[n − 1] | y1'[n] | H(z) | y2' |
| 0 | 0 | $1 + Z^{-1}$ | 0 |
| 1 | 1 | | 2 |
| 0 | 1 | | 1 |
| 1 | 0 | | 1 |

Ceaselessly, the three-level binary signal y2' is inputted into the receiver 53 through the channel 52 for recovering the digital signal $D_{in}'$.

Figure 8:
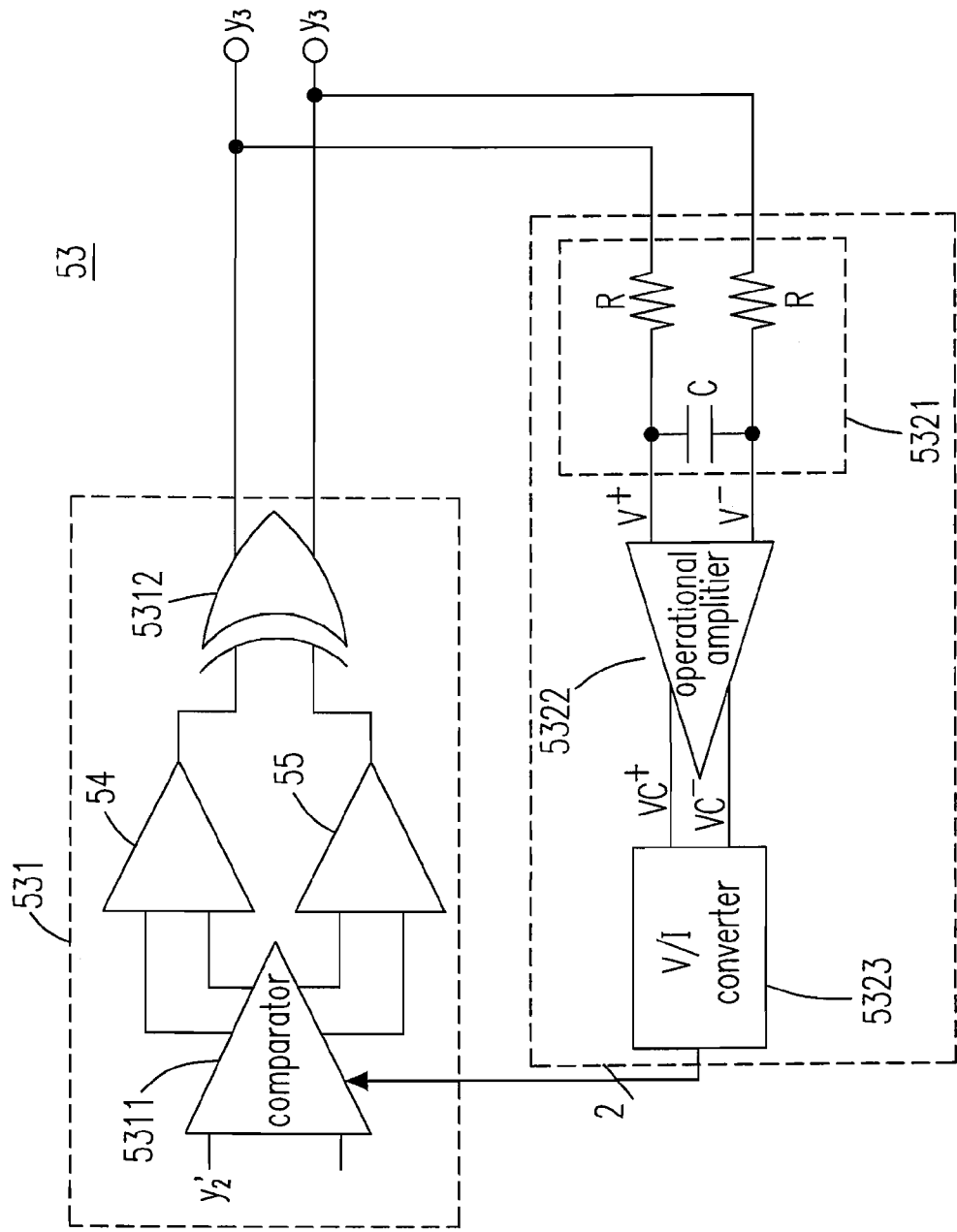
FIG. 8 shows a receiver circuit in the embodiment.

FIG. 8 shows a circuit of the receiver 53. As shown, the receiver 53 includes a decoder 531 and an adaptive reference voltage control loop 532, wherein the decoder 531 includes a comparator 5311 and a second logic circuit 5312. The detailed descriptions of the comparator 5311 in the decoder 531 are illustrated in the FIG. 9. In the FIG. 9, clearly, the comparator 5311 includes a first and a second differential amplifiers 53111 and 53112 each of which has a positive and a negative terminal, and the bias currents of the first and the second differential amplifiers 53111 and 53112 are different.

Continuously, the three-level duobinary signal y2' from the channel 52 is inputted into the first differential amplifier 53111 including a first NMOS M1 and a second NMOS M2 and the second differential amplifier 53112 including a third NMOS M3 and a forth NMOS M4.

In the meanwhile, the comparator 5311 compares a voltage value V1 at a drain D of the positive terminal of the second NMOS M2 of the first differential amplifier 53111 with a voltage value V2 at a drain D of the negative terminal of the third NMOS M3 of the second differential amplifier 53112 to generate a first comparison result (a bit, the first comparison result means a least significant bit, LSB) and the comparator 5311 compares a voltage value V3 at a drain D of the positive terminal of the first NMOS M1 of the first differential amplifier 53111 with a voltage value V3 at a drain D of the positive terminal of the forth NMOS M4 of the second differential amplifier 53112 to generate a second comparison result (a bit, the second comparison result is a most significant bit, MSB). And then the comparator 5311 regards the first 53111 and the second differential amplifiers 53112 with different bias current as a comparator 53111 having a first reference voltage and a comparator 53112 having a second reference voltage based on the described circuit, wherein the first and the second reference voltages are different. It is understood that the first comparison result represents a voltage value relationship between the three-level binary signal y2'; for example, if the bit of the first comparison result is 1, the voltage value of the three-level binary signal y2' is higher than that of the first reference voltage. The second comparison result represents a voltage value relationship between the three-level binary signal y2' and the reference voltage; for example, if the bit of the second comparator result is 1, the voltage value of the three-level binary signal y2' is higher than that of the second reference voltage. Further, the comparator 5311 transmits the first and the second comparison results (as two-bit comparison result, such as any of 00,01 or 11) to the second logic circuit 5312, such as a XOR gate, to implement an exclusive-OR operation (that is, for decoding and recovering the three-level binary signal y2' from the channel 52) to generate a differential signal y3. Hitherto, the differential signal y3 from the XOR gate 5312 is transmitted into other logic circuits for signal processing.

However, the differential signal y3 from the XOR gate 5312 is simultaneously transmitted to the adaptive reference voltage control loop 532 in the receiver 53 to dynamically adjust the two different bias currents of the differential amplifiers 53111 and 53112. Still further, and as explained in FIG. 8, the adaptive reference voltage control loop 532 includes a filter 5321, an operational amplifier 5322 having a positive and a negative terminals and a V/I (Voltage/Current) converter 5323.

In the adaptive reference voltage control loop 532, the filter 5321 filters the voltage of the differential signal y3 from the XOR gate 5312. A positive and a negative terminal average DC voltages $V^+$ and $V^-$ of the differential signal y3 are outputted to the operational amplifier 5322 having a positive and a negative terminals respectively. The operational amplifier 5322 amplifies the differences between the positive and the negative terminal average DC voltages $V^+$ and $V^-$ of the filter 5321 to generate a control voltage signal including a positive and a negative control voltage signals $VC^+$ and $VC^-$.

Figure 9:
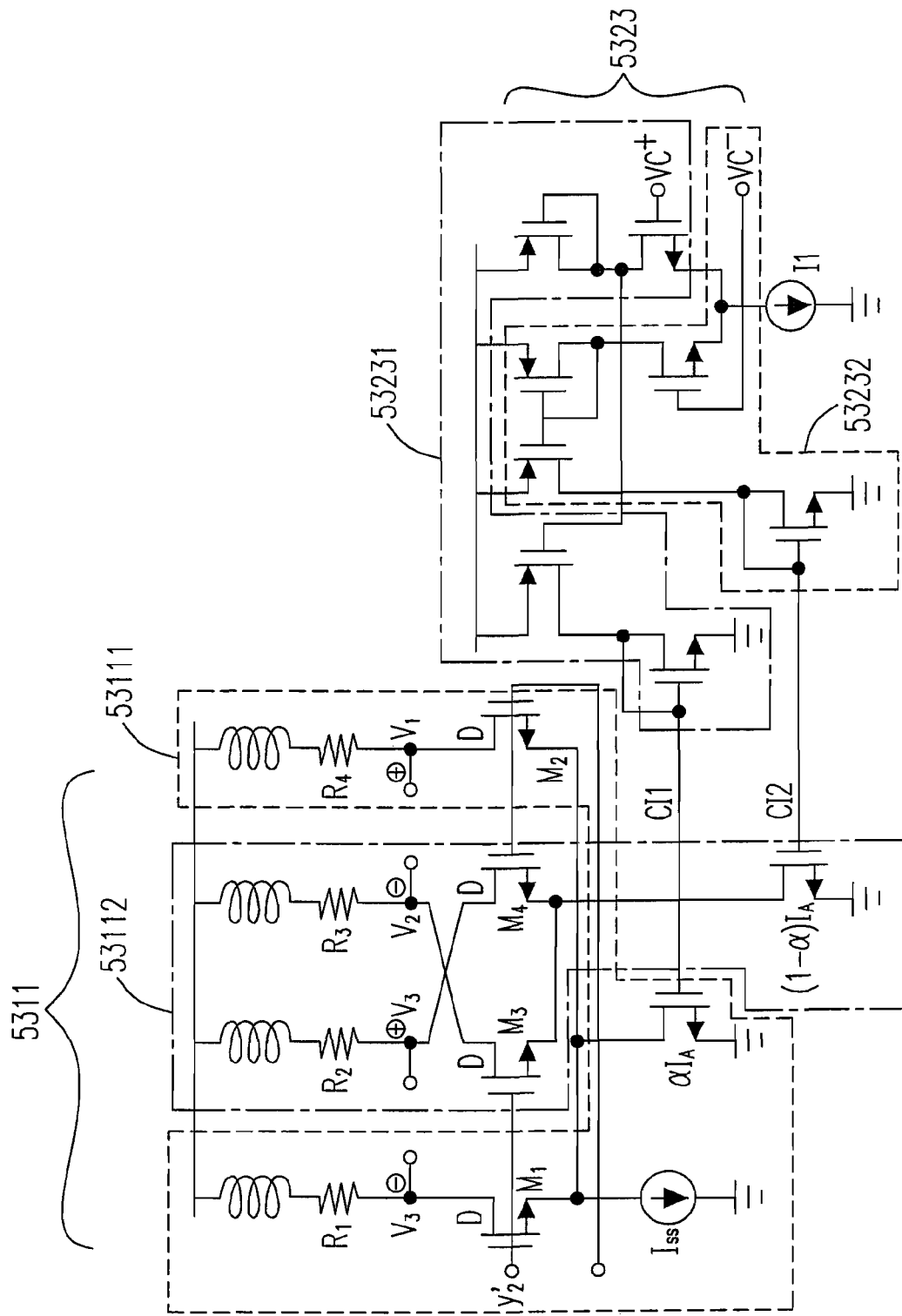
FIG. 9 shows a comparator and V/I converter in the receiver circuit according to the embodiment.

Referring now to FIG. 9, the V/I converter 5323 includes a first and a second current mirrors 53231 and 53232 and the first and the second current mirrors 53231 and 53232 allocate a steady current I1 according to the voltage ratio of the control voltage signal generated from the operational amplifier 5322, wherein the steady current I1 is manually predetermined. For example, when the voltage ratio of the positive control voltage signal $VC^+$ to the negative control voltage signal $VC^-$ is 2:1, the first current mirror 53231 approximately allocates two-thirds of the steady current I1 and the second current mirror 53232 approximately allocates one-third of the steady current I1. According to the allocated steady current I1, the mirrors 53231 and 53232 convert and output a first and a second control current signals CI1 and CI2, respectively. Then, the V/I converter 5323 inputs the first and the second control current signals CI1 and CI2 respectively into the comparator 5311 to change the bias currents of the first 53111 and the second differential amplifiers 53112 in the comparator 5311. That is, the first control current signal CI1 from the first current mirror 53231 and the second control current signal CI2 from the second current mirror 53232 can change the first reference voltage of the comparator 53111 and the second reference voltage of the comparator 53112.

Finally, noise generated from the channel can cause the distortion of the digital signals, which should be avoided. As shown in FIG. 8, the receiver 53 further comprises two hysteresis buffers 54 and 55 for amplifying the two-bit comparison result from the comparator 5311 in the receiver 53.

Figure 10:
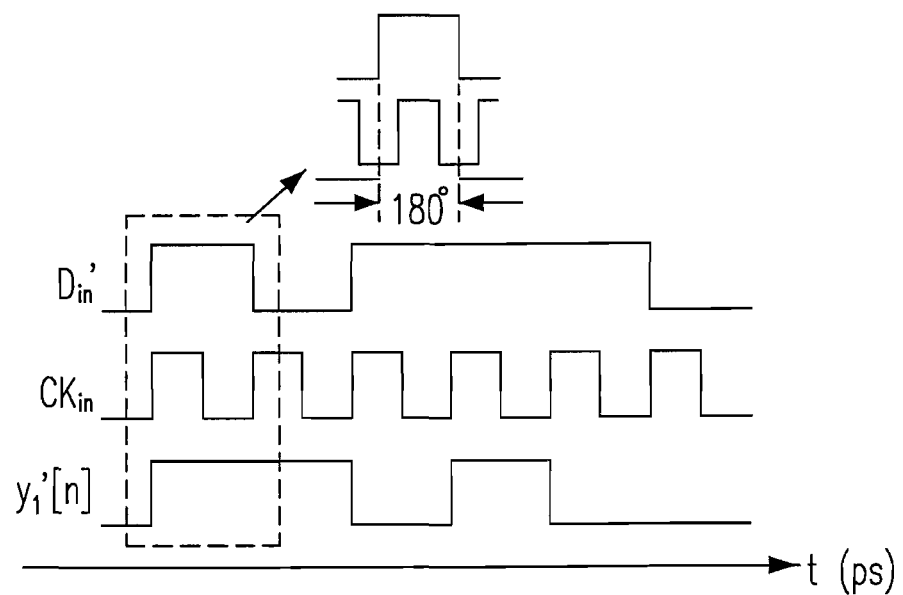
FIG. 10 shows the waveforms of a digital signal, a clock signal $CK_{in}$ and a coded digital signal y1'.

To sum up, the precoder proposed by the invention is not a conventional closed-loop such that the precoder in the transceiver can allow the relax phase relationship to reveal between the digital signal $D_{in}'$ and the clock signal $CK_{in}$. That means the clock signal $CK_{in}$ representing a current margin for skews as wide as 180° shown in FIG. 10.

However, the conventional receiver using two comparators with reference voltages, which are manually set or predetermined based on the voltage of the three-level binary signal. The first and the second current mirrors proposed by the invention dynamically adjust the first and the second differential amplifiers with two different bias current, respectively-that means the first control current generated by the first current mirror and the second control current generated by the second current mirror can change the two reference voltages of the comparator with the first reference voltage and the second reference voltage. In other words, the comparator in the receiver is not manually operated. Furthermore, as the concept of IC design, the transceiver proposed the invention have cost effective advantages that it requires only one comparator when compared to the conventional transceiver including two comparators.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims, which are to be accorded with the broadest interpretation so as to encompass all such modifications and similar structures.

What is claimed is:

1. A duobinary transceiver, comprising:
a transmitter including an open-loop circuit containing a first logic circuit and a divided-by-two circuit receiving a first digital signal and a clock signal to generate a coded digital signal, wherein the first logic circuit includes an AND gate;
a transmission medium converting the coded digital signal to generate a duobinary digital signal; and
a receiver including a comparator receiving the duobinary digital signal through the transmission medium;
a second logic circuit decoding and recovering the duobinary digital signal to generate a differential digital signal; and
an adaptive reference voltage control loop including:
a filter filtering the differential digital signal to generate a positive and a negative average DC voltages;
an operational amplifier having a positive and a negative terminals, and amplifying a difference between the positive and the negative average DC voltages to generate a control voltage signal; and
a voltage-to-current (V/I) converter converting the control voltage signal to a first and a second control current signals, and inputting the first and the second control current signals into the comparator.

2. A duobinary transceiver of claim 1, wherein the first digital signal includes a non-return-to-zero signal and the transmitter has a precoder including the first logic circuit and the divided-by-two circuit.

3. A duobinary transceiver of claim 2, wherein the transmitter further comprises an equalizer coupled to the precoder, and compensating the coded digital signal.

4. A duobinary transceiver of claim 1, wherein the transmission medium is selected from one of a copper cable, optical fiber and a printed circuit board.

5. A duobinary transceiver of claim 1, wherein the receiver further comprises
a decoder including the comparator and the second logic circuit, wherein the comparator has a comparison reference voltage and compares the duobinary digital signal with the comparison reference voltage to generate a two-bit comparison result.

6. A duobinary transceiver of claim 5, wherein the V/I converter comprises a first and a second current mirrors converting the control voltage signal to the first and the second control current signals based on the voltage of the control voltage signal generated from the operational amplifier.

7. A duobinary transceiver of claim 5, wherein the comparator comprises:
a first differential amplifier having a first bias current and a positive and a negative terminals; and
a second differential amplifier having a second bias current and a positive and a negative terminals; and
the first and the second bias currents are different.

8. A duobinary transceiver of claim 7, wherein the first differential amplifier has a first reference voltage, the second differential amplifier has a second reference voltage, and the comparison reference voltage is one of the first and the second reference voltages.

9. A duobinary transceiver of claim 7, wherein the comparator compares a voltage at the positive terminal of the first differential amplifier with a voltage at the negative terminal of the second differential amplifier to generate a first comparison result, and compares a voltage at the negative terminal of the first differential amplifier with a voltage at the positive terminal of the second differential amplifier to generate a second comparison result.

10. A duobinary transceiver of claim 9, wherein each of the first and the second comparison results is a one-bit result.

11. A duobinary transceiver of claim 5, wherein the receiver further comprises two hysteresis buffers for amplifying the two-bit comparison results from the comparator.

12. A receiver, comprising:
a decoder including:
a comparator having a comparison reference voltage, receiving a duobinary digital signal and comparing the duobinary digital signal with the comparison reference voltage to generate a two-bit comparison result; and
a logic circuit decoding the two-bit comparison result so as to recover the duobinary digital signal to generate a differential digital signal; and
an adaptive reference voltage control loop comprising:

a filter filtering the differential digital signal to generate a positive and a negative average DC voltages;

an operational amplifier having a positive and a negative terminals, and amplifying a difference between the positive and the negative average DC voltages to generate a control voltage signal; and a voltage-to-current (V/I) converter converting the control voltage signal to a first and a second control current signals, and inputting the first and the second control current signals into the comparator.

13. A receiver of claim 12, wherein the V/I converter comprises a first and a second current mirrors converting the control voltage signal to the first and the second control current signals based on a voltage of the control voltage signal generated from the operational amplifier.

14. A receiver of claim 12, wherein
the comparator comprises:
a first differential amplifier having a first bias current, and a positive and a negative terminals; and
a second differential amplifier having a second bias current, and a positive and a negative terminals, wherein the first and the second bias currents are different.

15. A receiver of claim 14, wherein the first differential amplifier has a first reference voltage, the second differential amplifier has a second reference voltage, and the comparison reference voltage is one of the first and the second reference voltages.

16. A receiver of claim 14, wherein the comparator compares a voltage at the positive terminal of the first differential amplifier with a voltage at the negative terminal of the second differential amplifier to generate a first comparison result and compares a voltage at the negative terminal of the first differential amplifier with a voltage at the positive terminal of the second differential amplifier to generate a second comparison result.

17. A receiver of claim 16, wherein each of the first and the second comparison results is a one-bit result.

18. A receiver of claim 12, wherein the receiver further comprises two hysteresis buffers for amplifying the two-bit comparison results from the comparator.

19. A duobinary transceiver, comprising:
a transmitter coding a first digital signal to generate a coded digital signal;
a transmission medium converting the coded digital signal to generate a duobinary digital signal; and
a receiver including:
a comparator to receive the duobinary digital signal through the transmission medium;
a logic circuit decoding and recovering the duobinary digital signal to generate a differential digital signal; and
an adaptive reference voltage control loop including:
a filter filtering the differential digital signal to generate a positive and a negative average DC voltages;
an operational amplifier having a positive and a negative terminals, and amplifying a difference between the positive and the negative average DC voltages to generate a control voltage signal; and
a voltage-to-current (V/I) converter converting the control voltage signal to a first and a second control current signals, and inputting the first and the second control current signals into the comparator.

* * * * *